United States Patent
Kobayashi

(10) Patent No.: US 7,554,594 B2
(45) Date of Patent: Jun. 30, 2009

(54) SOLID-STATE IMAGE PICKUP APPARATUS FOR COMPENSATING FOR DETERIORATION OF HORIZONTAL CHARGE TRANSFER EFFICIENCY

(75) Inventor: Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 597 days.

(21) Appl. No.: 11/433,427

(22) Filed: May 15, 2006

(65) Prior Publication Data
US 2007/0064136 A1    Mar. 22, 2007

(30) Foreign Application Priority Data
May 16, 2005    (JP)    ............... 2005-142183

(51) Int. Cl.
*H04N 5/335*    (2006.01)
(52) U.S. Cl. ...................... 348/311; 348/314
(58) Field of Classification Search ................ 348/311, 348/314
See application file for complete search history.

(56) References Cited

U.S. PATENT DOCUMENTS

| | | | | |
|---|---|---|---|---|
| 5,969,759 | A * | 10/1999 | Morimoto | 348/311 |
| 6,970,193 | B1 * | 11/2005 | Kidono et al. | 348/245 |
| 7,184,085 | B2 * | 2/2007 | Hakamata et al. | 348/311 |
| 7,432,965 | B2 * | 10/2008 | Mori | 348/243 |
| 2004/0174439 | A1 * | 9/2004 | Upton | 348/222.1 |
| 2005/0036040 | A1 * | 2/2005 | Honda et al. | 348/222.1 |

FOREIGN PATENT DOCUMENTS

JP    2004-327722 A    11/2004

* cited by examiner

*Primary Examiner*—Nhan T Tran
*Assistant Examiner*—Amy Hsu
(74) *Attorney, Agent, or Firm*—Birch, Stewart, Kolasch & Birch, LLP

(57) ABSTRACT

A solid-state image pickup apparatus includes an image sensor provided with an image sensing surface including a photosensitive zone for measurement and an optical black area adjoining an output circuit. Signal charges read out from the photosensitive zone for measurement and optical black area are used to calculate local horizontal transfer efficiency in the event of concentration of signal charges transferred from a horizontal transfer path to the output circuit. Image signals read out from the photosensitive zone for measurement and the optical black area, which are remote from the output circuit, are used to calculate an all-stage horizontal transfer efficiency over all stages of the horizontal transfer path. The horizontal transfer efficiencies are used to calculate stage-based horizontal transfer efficiencies at consecutive positions on the horizontal transfer path. The stage-based horizontal transfer efficiencies are used to calculate-transfer efficiency correction amounts for the consecutive positions in the horizontal direction.

6 Claims, 7 Drawing Sheets

SOLID-STATE IMAGE PICKUP APPARATUS FOR COMPENSATING FOR DETERIORATION OF HORIZONTAL CHARGE TRANSFER EFFICIENCY

BACKGROUND OF THE INVENTION

1. Field of the Invention

The present invention relates to a solid-state image pickup apparatus capable of compensating for the deterioration in efficiency of the horizontal transfer of signal charge visually conspicuous in an image output in, e.g. a high ISO (International Standards Organization) sensitivity mode.

2. Description of the Background Art

With a conventional solid-state image pickup apparatus of the type operable in a high ISO sensitivity mode, a problem is that a signal level output from an image sensor after picking up an image of a subject field is decreasing with an increase in the number of pixels, or photosensitive cells, of the imaging frame and a decrease in the size of the individual pixel. Another problem is that during horizontal transfer of signal charge in the image sensor a signal amount received from the preceding pixel and a charge amount left in the following pixel have an upwardly convex characteristic with respect to the signal level, so that the ratio of a transfer remainder increases with respect to the original signal in the form of an offset and critically degrades colors of the captured image. This is particularly true when the amount of signal charges to be transferred is small.

On the other hand, in the high ISO sensitivity mode, a type of image pickup apparatus executes gain control on an image signal output from the image sensor with its high gain. At this instant, because noise is conspicuous in the resulting image due to the deterioration in efficiency of the horizontal transfer of signal charge, it is necessary to accurately measure the horizontal transfer efficiency and examine the image sensor on the basis of the result of measurement.

In light of the above, Japanese patent laid-open publication No. 2004-327722, for example, discloses a solid-state image sensor configured such that at the manufacturing process image data A and B are produced from two kinds of photodiodes each storing a particular amount of signal charge. Subsequently, mean values $A_1$ and $B_1$ are calculated of differences between signals output from two nearby pixels around an electric-charge concentrating portion by using the image data A and B. Also, other mean values $A_2$ and $B_2$ are calculated of differences of signals output from two nearby pixels at a portion remote from the concentrating portion by also using the image data A and B. A ratio $T=A_1/B_1$ and a ratio $V=A_1/B_1$ are used to determine whether or not a defect of the concentrating portion is acceptable, and then the ratio T and a ratio $U=A_2/B_2$ are used to determine whether or not a defect of the horizontal transfer path is acceptable.

To compensate for the deterioration of horizontal transfer efficiency particular to a solid-state image pickup apparatus, correction values for signal processing may be calculated beforehand. However, differences between specific products of image sensor cannot be reflected by the correction unless the characteristic of the individual image sensor is measured beforehand. Further, the characteristic of the horizontal transfer efficiency of an image sensor is apt to vary in dependence upon ambient temperature and other environmental conditions. For example, when charges are transferred by drift, the characteristic of the horizontal transfer efficiency is considered to deteriorate in a low-temperature environment.

However, the solid-state image sensor taught in laid-open publication No. 2004-327722 mentioned earlier is assumed to use an image sensor originally having defects at least in its horizontal transfer portion, and is therefore unable to compensate for the deterioration of horizontal transfer efficiency in the event of image pickup. Moreover, the image pickup apparatus disclosed in the above document has its basis on a manufacturing process making correction on the horizontal transfer efficiency, so that it is extremely difficult to accomplish horizontal-transfer efficiency correction dependent on specific products of image sensor.

SUMMARY OF THE INVENTION

It is an object of the present invention to provide a solid-state image sensor capable of optimally compensating for the deterioration of horizontal transfer efficiency of signal charge conspicuous in an image picked up in, e.g. a high ISO sensitivity mode without regard to the individual difference between specific products of image sensor or ambient temperature and other environmental conditions.

A solid-state image pickup apparatus of the present invention includes an image sensor for transducing light incident on its image sensing surface, which has a plurality of pixels arranged in rows and columns, to signal charges on a pixel-by-pixel basis, shifting the signal charges on the rows transferred from said image sensing surface in a horizontal direction along a horizontal transfer path, concentrating the signal charges at a local portion, and transferring the concentrated signal charges to an output circuit that converts the concentrated signal charges to an electric signal. An analog signal processor and an analog-to-digital converter cooperate to convert the electric signal to a digital image signal. A signal processor executes digital signal processing on the digital image signal. The signal processor includes a transfer remainder analyzer for analyzing a local remainder representative of an amount of signal charges left untransferred at the local portion and an all-stage transfer remainder representative of signal charges left untransferred in all stages of the horizontal transfer path. A horizontal transfer remainder calculator calculates, based on the local remainder, a local horizontal transfer remainder with respect to signal charge transfer at the local portion, and calculates, based on the all-stage transfer remainder, a mean horizontal transfer remainder with respect to signal charge transfer in all the stages of the horizontal transfer path. A correction amount calculator calculates, based on the local horizontal transfer remainder and the mean horizontal transfer remainder, a correction efficiency correction amount for each position of the horizontal transfer path in the horizontal direction. A horizontal transfer efficiency corrector corrects individual image data included in the digital image signal and representative of an image picked up with the transfer efficiency correction amounts corresponding in position in the horizontal direction thereto.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
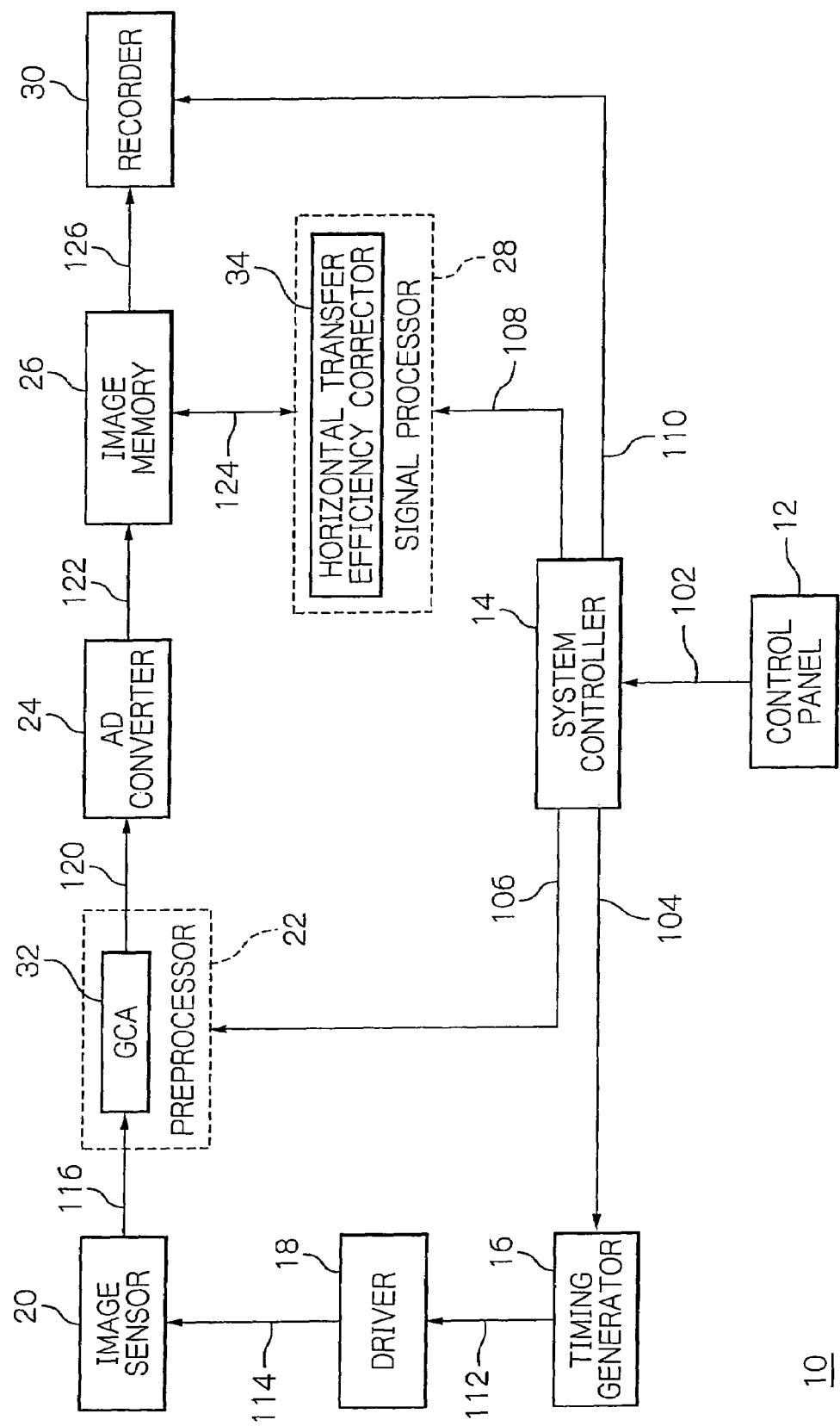
FIG. 1 is a schematic block diagram showing a preferred embodiment of a solid-state image sensor in accordance with the present invention.

Referring now to FIG. 1 of the accompanying drawings, a solid-state image pickup apparatus embodying the present invention, generally 10, is responsive to the operator's manipulation on a control panel 12 to process under the control of a timing controller 16 and a driver 18 an image signal representative of an image of a desired scene or field captured by an image sensor 20 and output therefrom with a preprocessor 22 and an analog-to-digital (AD) converter 24 to thereby generate a digital image signal, which is in turn temporarily stored in an image memory 26, from which the digital image signal is read out to be processed by a signal processor 28, specifically corrected by its horizontal transfer efficiency corrector 34, to be stored again in the image memory 26, while the digital image signal will again be read out form the image memory 26 to be recorded by a recorder 30. It is to be noted that part or components of the apparatus 10 not directly relevant to the understanding of the present invention are not shown and will not be described specifically in order to avoid redundancy.

The control panel 12 is a manual input device on which the operator of the apparatus may manually input desired information and commands. More specifically, the control panel 12, allowing the operator to input a desired command thereon, sends an operation signal 102 to the system controller 14 in accordance with the operator's manipulation, e.g. the operation of a shutter release key not shown.

In the illustrative embodiment, the shutter release is implemented as a push button configured to be depressed in two consecutive steps, i.e. to its first or half-stroke position from its undepressed or stand-by position and then to its second or full-stroke position. The half-stroke and full-stroke positions of the shutter release button indicate preliminary pickup and actual pickup of an image, respectively. Signals are designated by reference numerals attached to connections on which they appear.

The system controller 14 is a general controller adapted to control the operation of the entire pickup apparatus 10 in response to the operation signal 102 received from the control panel 12, and includes a CPU (Central Processing Unit) by way of example. In the illustrative embodiment, the system controller 14 generates control signals 104, 106, 108 and 110 in response to, e.g. the operation signal 102, and feeds them to the timing generator 16, preprocessor 22, signal processor 28 and recorder 30.

The timing generator 16 includes an oscillator, not shown, for generating a system clock, or basic clock, for the timing operation of the pickup apparatus 10, and may be adapted to deliver the system clock to various blocks or subsections of the circuitry, although not shown in FIG. 1 specifically. Further, the timing generator 16 generates a timing signal 112 in response to the control signal 104 fed from the system controller 14 and feeds the timing signal 112 to the driver 18 to control the driver 18 to drive the image sensor 20.

The driver 18 serves as driving the image sensor 20. In the illustrative embodiment, the driver 18 includes a horizontal drive section, a vertical drive section, an output circuit drive section and a shutter drive section, although not shown specifically. The driver 18 generates a drive signal 114 in response to the timing signal 112 fed from the timing generator 16 and feeds the drive signal 114 to the image sensor 20. For example, the horizontal drive section, vertical drive section, output circuit drive section and shutter drive section generate a horizontal drive signal, a vertical drive signal, a reset pulse and an electronic shutter pulse, respectively, and deliver them to a horizontal transfer path, vertical transfer paths, an output circuit and an electronic shutter, not shown, of the image sensor 20, respectively.

Figure 2:
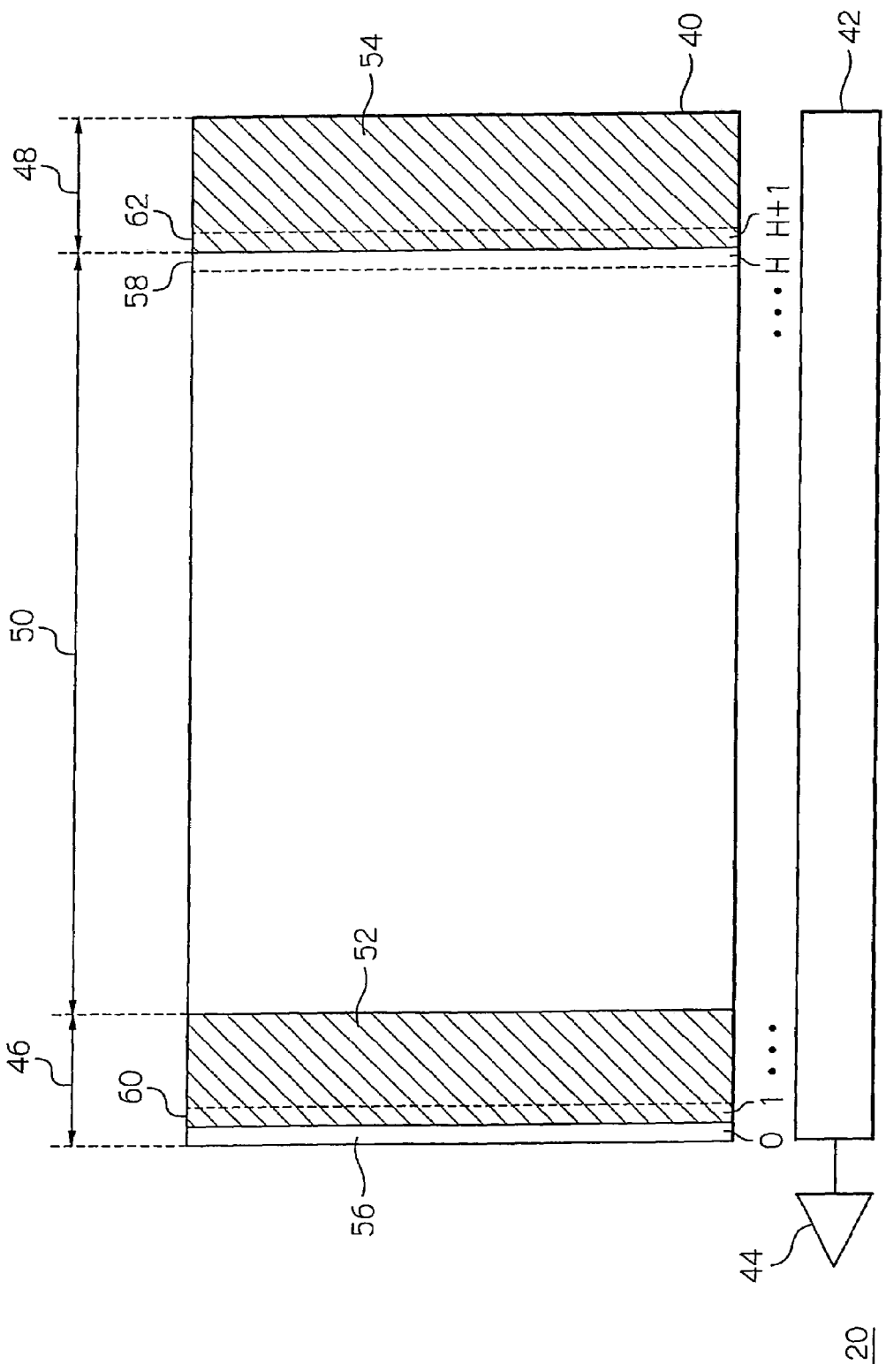
FIG. 2 is a plan view showing a specific configuration of an image sensor included in the illustrative embodiment shown in FIG. 1.

FIG. 2 shows a specific configuration of the image sensor 20 in a plan view. As shown, the image sensor 20 is generally made up of an image sensing surface or photosensitive array 40 forming a single image frame, a horizontal transfer path 42 and an output circuit 44. The image sensing surface 40 has a number of photodiodes or photosensitive cells, not shown, arranged in rows and columns and each constituting a single pixel, and vertical transfer paths each being arranged on a particular column. The image sensor 20 converts the optical image of a field to an analog electric signal 116, FIG. 1, and may be implemented by a CCD (Charge Coupled Device) type of image sensor by way of example.

In the illustrative embodiment, the image sensor 20 may be configured to read out, under the control of the drive signal 114, signal charges generated in the photosensitive cells in response to incident light to the vertical transfer paths, sequentially shift the signal charges along the vertical transfer paths in response to the vertical drive signal included in the drive signal 114, transfer the signal charges from the vertical transfer paths to the horizontal transfer path 42 row by row, and shift the signal charges to the output circuit 44 over the horizontal transfer path 42 in response to the horizontal drive signal also included in the drive signal 114. The output circuit 44 converts the signal charges input thereto to the analog electric signal 116. Further, when transferring the signal charges to the output circuit 44 on the horizontal transfer path 42, the image sensor 20 causes its local portion, not shown, to concentrate the signal charges.

As shown in FIG. 2, the image sensing surface 40 has non-effective areas 46 and 48 located at opposite ends in the horizontal direction, and an effective area 50 located between the non-effective areas 46 and 48. In the illustrative embodiment, the apparatus 10 is adapted to produce an image on the basis of signal charges generated in the effective area 50 while calculating correction amounts for correcting the image on the basis of the result of the transfer of signal charges available in the non-effective areas 46 and 48. The image sensor 20 of the illustrative embodiment has its focus and exposure controlled such that light input via a lens, not shown, is incident not only on the effective area 50 but also on the non-effective areas 46 and 48, thus forming an image circle.

Further, in the illustrative embodiment, optical black (OB) zones 52 and 54 are formed in the non-effective areas 46 and 48, respectively. In addition, in the non-effective area 46 at the output side in the horizontal direction, i.e. at the left-hand side in FIG. 2, a photosensitive zone 56 for measuring transfer efficiency is formed at the left-hand side of the optical black area 52, and may be implemented by a single column of pixels. Also, in the non-effective area 48 on the right-hand side in the figure, a photosensitive zone for measurement 58 is formed by the leftmost effective column of cells adjacent to the optical black zone 54, i.e. the last column of the effective area 50.

In the illustrative embodiment, the effective area 50 and photosensitive zone 56 each include a plurality of photodiodes or similar photosensitive cells for converting incident light to corresponding signal charges in accordance with the quantity of light. The photosensitive zone 56 may include a smaller number of photosensitive cells per column than the effective area 50. Alternatively, it may include a more number of photosensitive cells adapted for producing the multiple level of signal charges so as to more accurately measure the transfer efficiency.

On the other hand, each of the optical black areas 52 and 54 includes a plurality of non-photosensitive cells in the form of optically black pixels that generate signal charges of substantially zero level without regard to the quantity of incident light. The non-sensitive cells may be implemented as dummy pixels formed by, e.g. providing optical-shield films on usual photosensitive cells or removing optical sensors from the usual photosensitive cells. Alternatively, wirings for controlling readout gates or the readout gates themselves may be removed from the ordinary photosensitive cells to function as the non-sensitive cells.

In the illustrative embodiment, the horizontal transfer path 42 stores each row of signal charges input from the vertical transfer paths into, e.g. packets column by column, and sequentially transfers the signal charges in the packets to the neighboring packets toward the output circuit 44 to deliver them to the output circuit 44. If desired, the packets of the horizontal transfer path 42 may be arranged in correspondence to the respective rows of the effective area 50 and non-effective areas 48 and 48. For example, the packet corresponding to the photosensitive zone for measurement 56 and the packet corresponding to the column of the effective area 50 closest to the optical black area 54, i.e. the last column 58 of the effective area 50 may be dealt with as the zeroth or "0" stage and H-th or "H" (H being a positive integer) stage, respectively.

Referring again to FIG. 1, the preprocessor 22 is adapted to execute analog signal processing on the analog electric signal 116 representative of an image in response to the control signal 106 fed from the system controller 14, thereby outputting an analog image signal 120. In the illustrative embodiment, the preprocessor 22 includes a gain-controlled amplifier (GCA) 32 for controlling the gain of the analog electric signal 116 on the basis of ISO (International Standards Organization) sensitivity indicated by the control signal 106.

The AD converter 24 is adapted for quantizing the analog image signal 120 input from the preprocessor 22 with predetermined quantization levels to thereby output a corresponding digital image signal 122. The image memory 26 is implemented as a buffer memory for temporarily storing a digital image signal. In the illustrative embodiment, the image memory 26 is capable of temporarily storing the digital image signal 122 fed from the AD converter 24 or a digital image signal 124 output from the signal processor 28.

The signal processor 28 functions as processing the digital image signal 124 read out from the image memory 26 and then writing the processed digital image signal 124 in the image memory 26. More specifically, the signal processor 28 processes the digital image signal 124 with an offset corrector, a white balance (WB) corrector, a gamma corrector, a synchronizing circuit, a contour or edge enhancing circuit, a noise reducing circuit, a saturation enhancing circuit, a compressing circuit and so forth, although not shown specifically. Particularly, in the illustrative embodiment, the signal processor 28 calculates with the horizontal transfer efficiency corrector 34 correction amounts by which horizontal transfer efficiency should be corrected on the basis of digital image signal 124.

Figure 3:
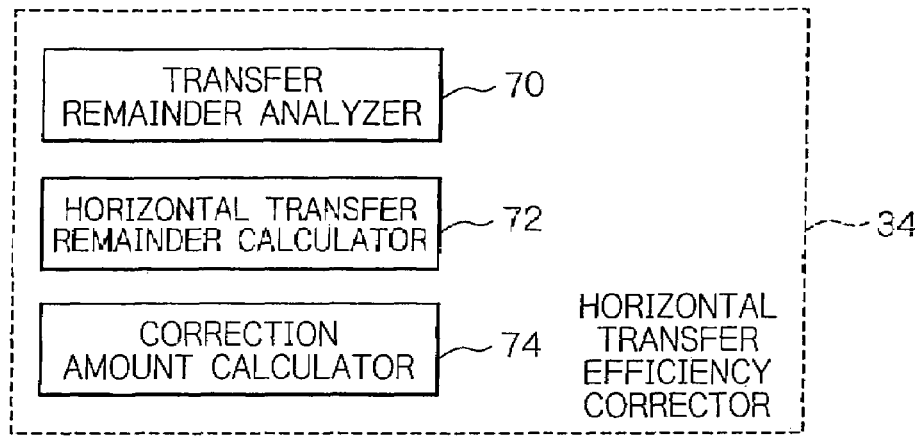
FIG. 3 is a schematic block diagram showing a specific configuration of a horizontal transfer efficiency corrector included in a signal processor forming part of the illustrative embodiment.

FIG. 3 shows a specific configuration of the horizontal transfer efficiency corrector 34. As shown, the horizontal transfer efficiency corrector 34 is made up of a transfer remainder analyzer 70, a horizontal transfer remainder calculator 72 and a correction amount calculator 74. The horizontal remainder analyzer 70 is configured to calculate, based on a horizontal transfer remainder calculated, a correction amount by which horizontal transfer efficiency should be corrected.

More specifically, the transfer remainder analyzer 70 analyzes, among signal charges transferred from the photosensitive zone 56 of the image sensing surface 40 to the horizontal transfer path 42, a remainder not transferred, but mixed with signal charges transferred from the optical black area 52, to the horizontal transfer path 42, i.e. a local remainder or residual left when the above signal charges from the horizontal transfer path 42 are concentrated on the output circuit 44. Also, the transfer remainder analyzer 70 analyzes, among signal charges transferred from the entire effective area 50 to the horizontal transfer path 42, a remainder not transferred, but mixed with signal charges output from the optical black area 54, i.e. an all-stage remainder of signal charges left in all packets of the horizontal transfer path 42 without being transferred.

For example, to analyze the local remainder, the transfer remainder analyzer 70 acquires, based on the digital image signal 124, image data S(0) corresponding to signal charges on a preselected pixel row or rows included in the photosensitive zone 56 and image data S(1) corresponding to signal charges on a preselected row or rows on the pixel column of the optical black area 52 closest to the photosensitive zone 56, i.e. the first pixel column 60 of the optical black area 52. In the illustrative embodiment, the transfer remainder analyzer 70 acquires the image data S(0) and S(1) from each row of the photosensitive zone 56 and pixel column 60.

Likewise, when analyzing the all-stage remainder, the transfer remainder analyzer 70 acquires, based on the digital image signal 124, image data S(H) corresponding to signal charges on a preselected pixel row or rows included in the last pixel column 58 of the effective area 50 and pixel data S(H+1) corresponding to signal charges on the pixel column of the optical black area 54 closest to the effective area 50, i.e. the first pixel column 62 of the optical black area 54. The analyzer 70 acquires the image data S(H) and S(H+1) from each row of the pixel columns 58 and 62 in the same manner as during the analysis of the local remainder.

The horizontal transfer remainder calculator 72 calculates a function f0(S) representative of a local horizontal transfer remainder with respect to signal charge transfer in the local portion, or concentration from the horizontal transfer path 42 to the output circuit 44, and a function g(S) representative of a mean horizontal transfer remainder with respect to the signal charge transfer in all the packets of the horizontal transfer path 42.

For example, the horizontal transfer remainder calculator 72 may be configured to calculate the function f0(S) on the basis of the image data S(0) and S(1) detected by the transfer remainder analyzer 70. In such a case, signal charges output from the optical black area 52 all are assumed to be of zero level while all image data S(1) are representative of a remainder in local transfer.

Figure 4:
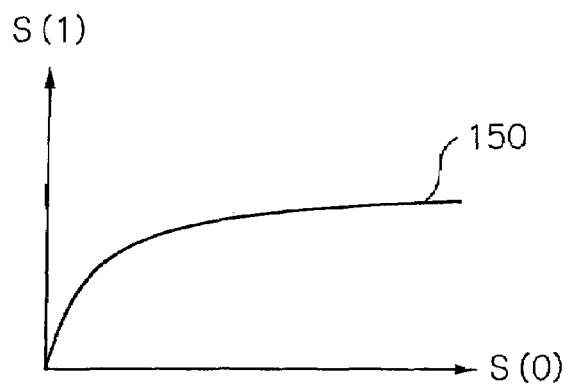
FIG. 4 is a graph showing how signal charges are left untransferred in part of a horizontal transfer path included in an image sensor of the illustrative embodiment.

As shown in FIG. 4, when the signal amount of the image data S(1) is plotted with respect to the signal amount of the image data S(0) level by level, there is obtained a curve 150 representative of correspondence between the image data S(0) and S(1). The horizontal transfer remainder calculator 72 transforms such a relation to a function, e.g. a quadratic function for thereby calculating a local horizontal transfer remainder f0(S) for a preselected signal amount S. It follows that the number of levels of image data S0(y) increases with an increase in the number of photosensitive cells constituting the photosensitive zone 56, allowing the local horizontal transfer remainder f0(S) to be advantageously calculated.

Figure 5:
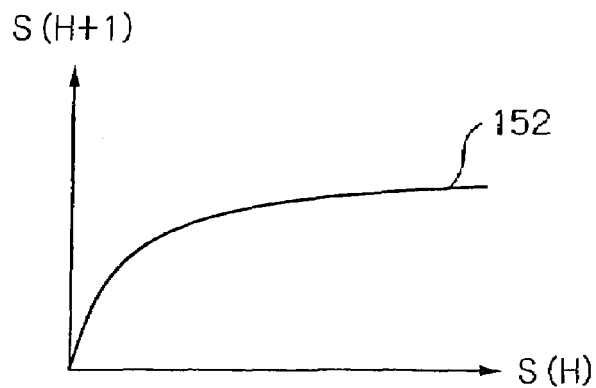
FIG. 5 is a graph, similar to FIG. 4, showing how signal charges are left untransferred at all stages of the horizontal transfer path.

Further, assuming, based on the image data S(H) and S(H+1), that the remainder left after the passage through all the stages of the horizontal transfer path 42 is stored in image data SH1(y), the horizontal transfer remainder calculator 72 calculates a function fH(S) representative of an all-stage horizontal transfer remainder based on the all-stage remainder of the horizontal transfer path 42. Now, similarly to the calculation of the local horizontal transfer remainder, FIG. 5 shows a curve 152 representative of a relation between the signal amount of image data S(H+1) plotted level by level and the signal amount of the image data S(H). The horizontal transfer remainder calculator 72 calculates the function fH(S) in accordance with the curve 152.

Furthermore, the horizontal transfer remainder calculator 72 calculates the mean horizontal transfer remainder g(S) mentioned earlier on the basis of the functions f0(S) and fH(S) representative of the local horizontal transfer remainder and all-stage horizontal transfer remainder, respectively. For example, the horizontal transfer calculator 72 calculates the above remainder g(S) for a given signal amount S by using an expression:

$$g(S)=(fH(S)-f0(S))/H$$

In this manner, assuming that transfer deterioration evenly occurs in the consecutive packets of the horizontal transfer path 42, the horizontal transfer remainder calculator 72 calculates the same mean horizontal transfer remainder g(S) for all packet.

The correction amount calculator 74 is adapted for calculating a correction amount for correcting transfer efficiency for each packet or stage of the horizontal transfer path 42. More specifically, in the illustrative embodiment, the correction amount calculator 74 calculates a horizontal transfer remainder f(S,x) in each stage in the horizontal direction in accordance with the local horizontal transfer remainder f0(S) and mean horizontal transfer remainder g(S), and then calculates a transfer efficiency correction amount ΔS(x) on the basis of the above remainder f(S,x) stage by stage.

For example, the correction amount calculator 74 calculates a horizontal transfer remainder f(S,x) at a given stage or position x of the horizontal transfer path 42 for a given signal amount S by using an expression:

$$f(S,x)=f0(S)+x*g(S)$$

Subsequently, the correction amount calculator 74 calculates, based on the horizontal transfer remainder f(S,x) thus determined, a transfer efficiency correction amount ΔS(x) by using an expression:

$$\Delta S(x)=f(S,x)-f(S,x-1)$$

By repeating the above procedure, the correction amount calculator 74 determines transfer efficiency correction amounts ΔS(x) in the consecutive stages of the horizontal transfer path 42.

The correction amount calculator 74 may serve as, e.g. a filter covering nearby pixels. In such a case, the transfer efficiency correction amounts ΔS(x) in the consecutive stages may preferably be used when the horizontal transfer efficiency corrector 34 executes correction.

The horizontal transfer efficiency corrector 34 is adapted for using the transfer efficiency correction amounts ΔS(x) thus calculated to correct the digital image signal 124 in such a manner as to correct the horizontal transfer efficiency of each pixel data. For example, as for predetermined pixel data which are the signal amount S and the pixel position x in the horizontal direction, the corrector 34 adds the transfer efficiency correction amount ΔS(x) to the signal amount S of the pixel data for correction.

If desired, the horizontal transfer remainder calculator 72 of the horizontal transfer efficiency corrector 34 may cause another constituent element, e.g. the system controller 14, to calculate the transfer remainders. Also, the horizontal transfer remainder calculator 72 may be omitted from the transfer efficiency corrector 34 if its function is assigned to such a constituent element. For example, the horizontal transfer efficiency correction 34 may command the system controller 14 to calculate transfer remainders and return them thereto.

The recorder 30 serves as receiving and recording the digital image signal 126 output from the signal processor 28. In the illustrative embodiment, the recorder 30 is configured to write the digital image signal 126, which has been compressed by the compressing circuit of the signal processor 28, in a data recording medium not shown. The data recording medium may be implemented by, e.g. a package accommodating a memory card with a semiconductor memory or a magnetooptical disk or similar rotary recording medium. Such a data recording medium may be removably mounted to the recorder 30.

Figure 6:
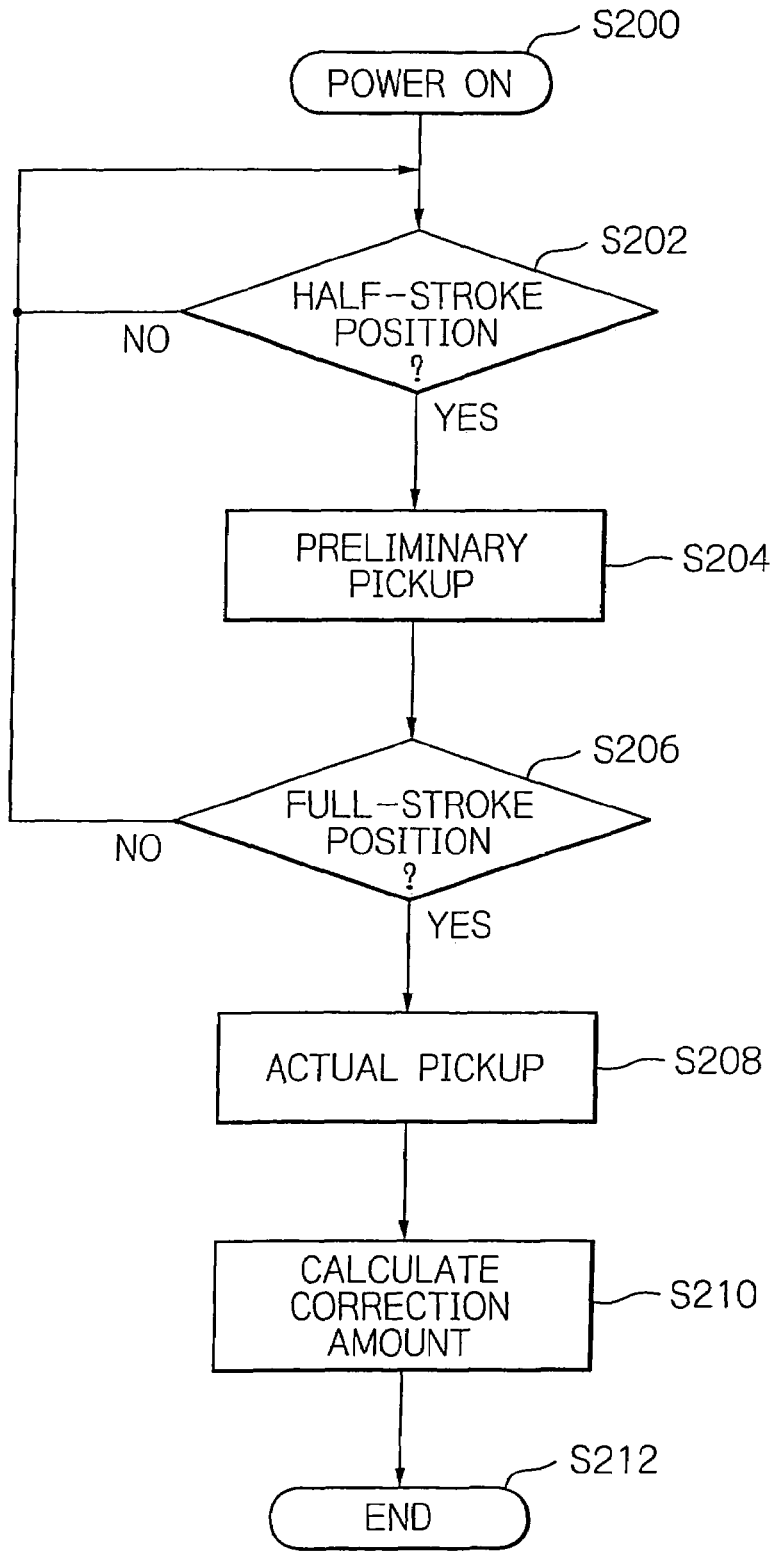
FIG. 6 is a flowchart useful for understanding a specific operation of the illustrative embodiment.

Reference will be made to FIG. 6 for describing a specific operation of the illustrative embodiment. As shown, assume that on the power-up of the image pickup apparatus 10, i.e. in a stand-by condition (step S200), the operator of the apparatus 10 operates the shutter release button on the control panel 12. It is then determined whether or not the shutter release button is depressed to its half-stroke position (step S202). The procedure advances to preliminary pickup (step S204) if the answer of the step S202 is positive, Yes, or returns to the stand-by condition if it is negative, No.

In the event of preliminary pickup (step S204), automatic focus (AF) control, automatic exposure (AE) control and other conventional processing and control necessary for picking up a subject field are executed. Subsequently, it is determined whether or not the shutter release button is depressed to its full-stroke position (step S206). The procedure advances to actual pickup (step S208) if the answer of the step S206 is Yes or returns to the stand-by condition if it is No.

In the event of actual pickup (step S208), the driver 18 feeds the drive signal 114 indicative of actual pickup up to the image sensor 20. At this instant, light carrying the image of the field is incident on the effective area 50 and non-effective areas 46 and 48 of the image sensing surface 40, and converted to signal charges pixel by pixel in response to the drive signal 114. The signal charges thus generated in the image sensor 20 pixel by pixel are converted to an analog electric signal 116 via the vertical transfer paths, horizontal transfer path 42 and output circuit 44.

The analog electric signal 116 output from the image sensor 20 is transduced to a digital image signal 122 via the preprocessor 22 and AD converter 24, and then temporarily written to the image memory 26.

The digital image signal 122 thus stored in the image memory 26 is read out by the signal processor 28 as a digital image signal 124 and processed thereby into an image signal representing an image to be recorded in the recorder 30. Particularly, in the illustrative embodiment, the horizontal transfer efficiency corrector 34, included in the signal processor 28, calculates horizontal transfer efficiency correction values on the basis of the digital image signal 124 (step S210).

More specifically, in the step S210, the transfer remainder analyzer 70 detects, based on the digital image signal 124, image data S(0) corresponding to signal charges on preselected pixel rows of the photosensitive zone 56 and image data S(1) corresponding to signal charges on preselected rows of the first pixel column 60 included in the optical black area 52 a plurality of times. Also, the transfer remainder analyzer 70 detects, based on the digital image signal 124, image data S(H) corresponding to signal charges on preselected pixel rows of the last pixel column 58 included in the effective area 50 and image data S(H+1) corresponding to signal charges on preselected rows included in the first pixel column 62 of the optical black area 54 a plurality of times.

Subsequently, the horizontal transfer remainder calculator 72, included in the horizontal transfer efficiency corrector 34, calculates a local horizontal transfer remainder f0(S) on the basis of the row-based image data S(0) and S(1) and calculates an all-stage horizontal transfer remainder fH(S) on the basis of the row-based image data S(H) and S(H+1). Further, the horizontal transfer remainder calculator 72 calculates a mean horizontal transfer remainder g(S) in accordance with the local horizontal transfer remainder f0(S) and all-stage horizontal transfer remainder fH0(S).

Thereafter, the correction amount calculator 74, also included in the horizontal transfer efficiency corrector 34, calculates stage-based horizontal transfer remainders f(S,x) in preselected stage positions x of the horizontal transfer path 42 in accordance with the local horizontal transfer remainder f0(S) and mean horizontal transfer remainder g(S). The calculator 74 then calculates, based on the stage-based horizontal transfer remainders f(S,x), transfer efficiency correction amounts ΔS(x) for preselected stage positions x, which are all consecutive stage positions in the illustrative embodiment.

Finally, the horizontal transfer efficiency corrector 34 corrects, e.g. the individual pixel data of the digital image signal 124 by adding the transfer efficiency correction amounts ΔS(x) to the pixel data corresponding in pixel position in the horizontal direction. The digital image signal 124 thus subjected to signal processing by the signal processor 28 is again written to the image memory 26.

The digital image signal 126 subjected to the signal processing and written to the image memory 26, as stated above, is read out from the image memory 26 in response to a control signal 110 fed from the system controller 14 to the recorder 30, and then written to the data recording medium. This is the end of the actual pickup (step S212).

Figure 7:
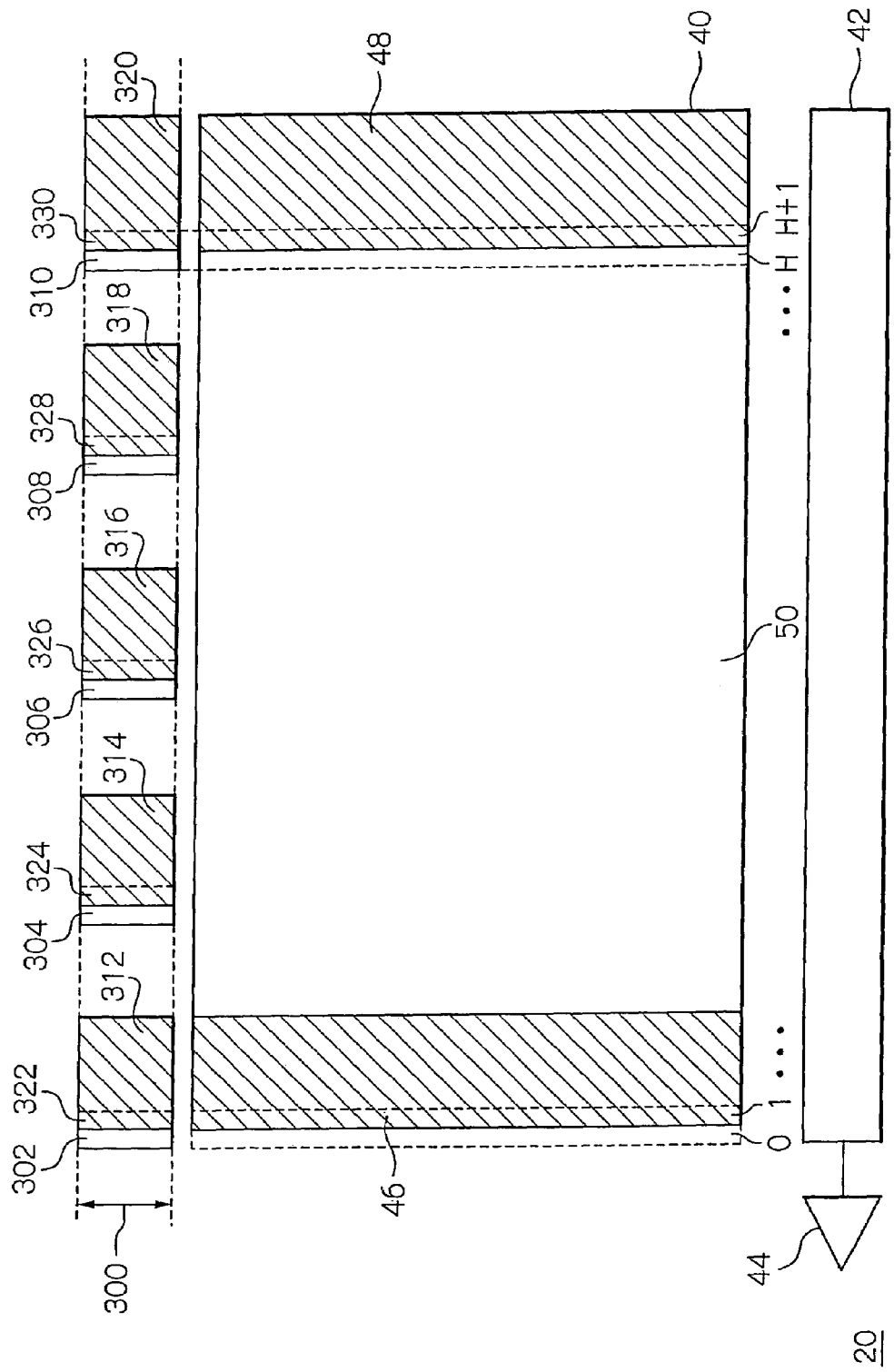
FIG. 7 is a plan view showing an image sensor included in an alternative embodiment of the present invention.

Referring now to FIG. 7, an alternative embodiment of the solid-state image pickup apparatus in accordance with the present invention, the image sensing surface 40 of the image sensor 20 includes a non-effective area 300 positioned above the effective area 50 and non-effective areas 46 and 48 in the vertical direction. Signal charges generated in the effective area 50 are used to form an image while the result of transfer of signal charges generated in the non-effective area 300 is used to calculate correction amounts for correcting the above image. The non-effective area 300 may be positioned below the effective area 50 and non-effective areas 46 and 48 in the vertical direction, if desired.

The non-effective area 300 includes a plurality of photosensitive zones 302, 304, 306, 308 and 310 for measuring transfer efficiency, and includes optical black zones 312, 314, 316, 318 and 320 positioned at the side opposite to the output circuit 44 in the horizontal direction, i.e. at the right-hand side in FIG. 7. While five photosensitive zones-302 through 310 are included in the alternative embodiment, the number of photosensitive zones may advantageously be controlled in matching relation to desired accuracy of transfer efficiency correction.

The photosensitive zones for measurement 302 through 310 each are implemented by a plurality of photodiodes or similar photosensitive cells arranged in a single column. The photosensitive zone 302 is used to measure the local transfer efficiency of the horizontal transfer path 42 while the photosensitive zone 310 is used to measure the transfer efficiency of all the stages constituting the horizontal transfer path 42. The other photosensitive zones 304, 306 and 308 are used to measure the efficiencies of the progressing transfer of charges by the horizontal transfer path 42. The optical black zones 312 through 320 are implemented as non-photosensitive zones consisting of optical black pixels each.

Particularly, in the alternative embodiment, the horizontal transfer efficiency corrector 34, included in the signal processor 28, detects, based on the digital image signal 124, signal charges output from the photosensitive zones 302 through 310, but left untransferred in the horizontal direction, and processes the image signal 124 in accordance with such a remainder of the signal charges. At this instant, the photosensitive zone 302 corresponds to the "0" or zeroth stage of the horizontal transfer path 40 while the photosensitive zones 304, 306, 308 and 310 respectively correspond to the "H/4", "H/2", "3H/4" and "H" stages of the same.

Stated another way, when N (positive integer) photosensitive zones for progressing measurement exist, the "M" (M being an integer smaller than N inclusive) photosensitive zone corresponds to the "M*H(N+1)" stage, and likewise the "M" optical black zone corresponds to the "M*H/(N+1)+1" stage. In this context, the quotation marks "X" represent an ordinal number X.

In the alternative embodiment, the transfer remainder analyzer 70 analyzes a local remainder representative of, among signal charges output from the photosensitive zone 302 and transferred by the horizontal transfer path 42, signal charges left untransferred when concentrated to the output circuit 44.

Also, the analyzer 70 analyzes the following remainders: a first progress remainder representative of, among signal charges output from the photosensitive zone 304, signal charges left untransferred in a first progress extending from the "0" stage to "H/4" stage, a second progress remainder representative of, among signal charges output from the photosensitive zone 306, signal charges left untransferred in a second progress extending from the "(H/4)+1" stage to "H/2", a third progress remainder representative of, among signal charges output from the photosensitive zone 308, signal charges left untransferred in a third progress extending from the "(H/2)+1" stage to "3H/4" stage, and an all-stage remainder representative of, among signal charges output from the photosensitive zone 310, signal charges left untransferred in the "(3H/4)+1" stage to "H" stage.

For example, to analyze the local remainder, the analyzer 70 acquires pixel data S(1) corresponding to signal charges on preselected pixel rows included in the photosensitive zone 302 and image data S(1) corresponding to signal charges on preselected pixel rows output from the pixel column of the optical black zone 312 closest to the photosensitive zone 302, i.e. the first pixel column 322 of the optical black zone 312. Also, in the entire non-effective area 300, the analyzer 70 acquires image data S(0) and S(1) on each of the consecutive rows.

Likewise, to analyze the first progress remainder, the analyzer 70 acquires pixel data S(H/4) corresponding to signal charges on a preselected pixel row included in the photosensitive zone 304 and pixel data S(H/4+1) corresponding to signal charges on a preselected pixel row included in the first pixel column 324 of the optical black zone 314. In the alternative embodiment, the analyzer 70 is configured to acquire the pixel data S(H/4) and S(H/4+1) on every row.

To analyze the second progress remainder, the analyzer 70 acquires pixel data S(H/2) corresponding to signal charges on a preselected pixel row included in the photosensitive zone 306 and pixel data S(H/2+1) corresponding to signal charges on a preselected pixel row included in the first pixel column 326 of the optical black zone 316. In the alternative embodiment, the analyzer 70 is configured to acquire the pixel data S(H/2) and S(H/2+1) on every row.

To analyze the third progress remainder, the analyzer 70 acquires pixel data S(3H/4) corresponding to signal charges on a preselected pixel row included in the photosensitive zone 308 and pixel data S(3H/4+1) corresponding to signal charges on a preselected pixel row included in the first pixel column 328 of the optical black zone 318. In the alternative embodiment, the analyzer 70 is configured to acquire the pixel data S(3H/4) and S(3H/4+1) on every row.

Further, to analyze the all-stage remainder, the analyzer 70 acquires pixel data S(H) corresponding to signal charges on a preselected pixel row included in the photosensitive zone 310 and pixel data S(H+1) corresponding to signal charges on a preselected pixel row included in the first pixel column 330 of the optical black zone 320. In the alternative embodiment, the analyzer 70 is configured to acquire the pixel data S(H) and S(H+1) on every row.

In the alternative embodiment, the horizontal transfer remainder calculator 72, included in the horizontal transfer efficiency corrector 34, calculates a function f0(S) representative of a local horizontal transfer remainder corresponding to the local remainder, functions g1(S), g2(S) and g3(S) representative of a first, a second and a third progress mean horizontal transfer remainder, respectively, corresponding to the first, second and third progress remainders, and a function gH(S) representative of a total mean horizontal transfer remainder corresponding to the all-stage remainder.

Figure 8:
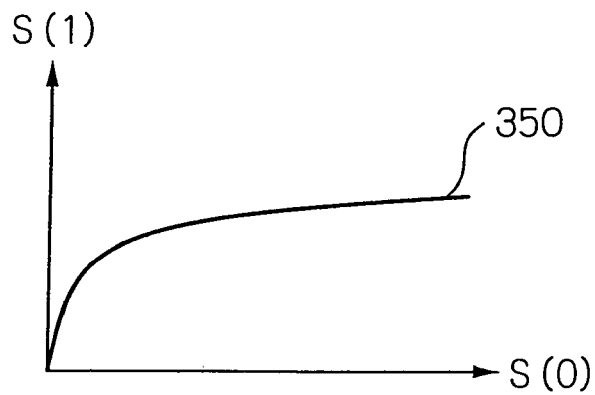
FIG. 8 is a graph showing how signal charges are left untransferred on a horizontal transfer path included in the alternative embodiment.

For example, the horizontal transfer remainder calculator 72 calculates the local horizontal transfer remainder f0(S) on the basis of the image data S(0) and S(1). FIG. 8 shows a curve 350 representative of a relation of the signal amount of the image data S(1) to the signal amount of the image data S(0), as plotted level by level. The calculator 72 produces a function representative of the relation represented by the curve 350 for thereby calculating the local horizontal transfer remainder f0(S) with respect to the given signal amount S.

Figure 9:
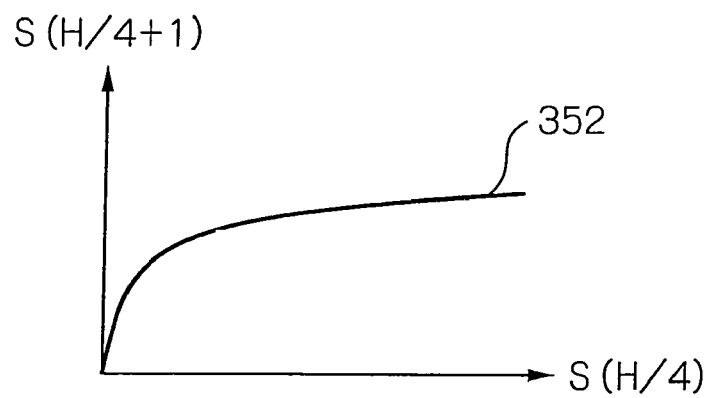
FIGS. 9, 10 and 11 are graphs, similar to FIG. 8, showing how signal charges are left untransferred in the first, second and third progresses of the horizontal transfer path, respectively.

Also, assuming that remainders in, e.g. the "0" stage to "H/4" stage of the horizontal transfer path 42 are, in the first progress, accumulated in the image data S((H/4)+1) on the basis of the image data S(H/4) and S((H/4)+1), the calculator 72 calculates a function f1(S) representative of a horizontal transfer remainder of the first progress. More specifically, the calculator 72 calculates the function f1(S) in accordance with a curve 352 as shown in FIG. 9 and representative of a relation of the signal amount of the image data S((H/4)+1) to the signal amount of the image data S(H/4) in the same manner as it has calculated a local horizontal transfer remainder.

Figure 10:
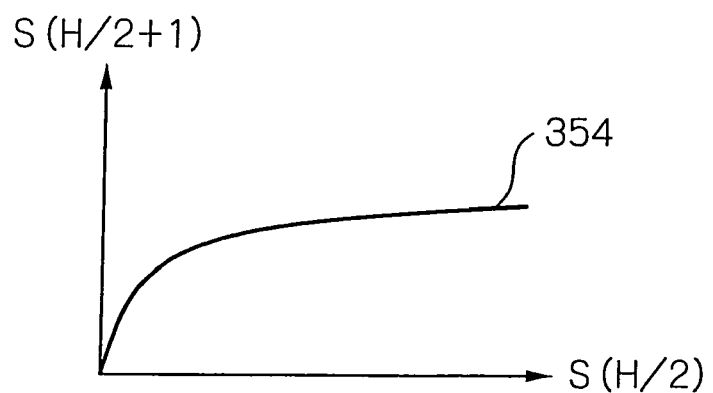

Likewise, assuming that remainders in, e.g. the "(H/4)+1" stage to "H/2" stage of the horizontal transfer path 42 are, in the second progress, accumulated in the image data S((H/2)+1) on the basis of the image data S(H/2) and S((H/2)+1), the calculator 72 calculates a function f2(S) representative of a horizontal transfer remainder of the second progress. More specifically, the calculator 72 calculates the function f2(S) in accordance with a curve 354 as shown in FIG. 10 and representative of a relation of the signal amount of the image data S((H/2)+1) to the signal amount of the image data S(H/2) in the same manner as it has calculated a local horizontal transfer remainder.

Figure 11:
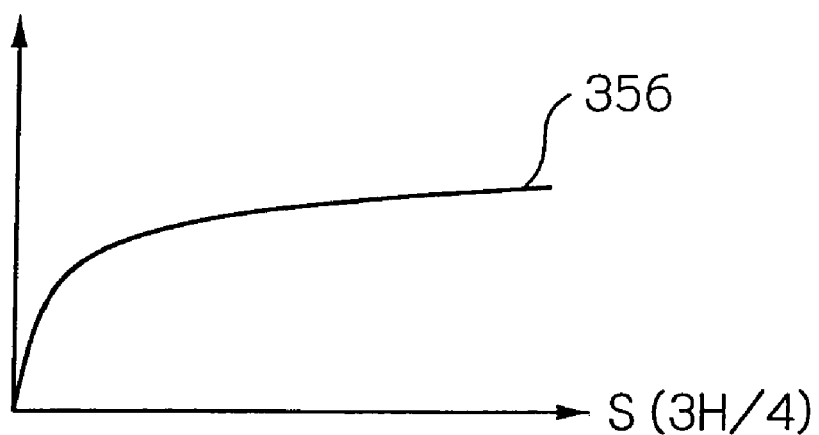

Also, assuming that remainders in, e.g. the "(H/2)+1" stage to "3H/4" stage of the horizontal transfer path 42 are, in the third progress, accumulated in the image data S((3H/4)+1) on the basis of the image data S(3H/4) and S((3H/4)+1), the calculator 72 calculates a function f3(S) representative of a horizontal transfer remainder of the third progress. More specifically, the calculator 72 calculates the function f3(S) in accordance with a curve 356 as shown in FIG. 11 and representative of a relation of the signal amount of the image data S((3H/4)+1) to the signal amount of the image data S(3H/4) in the same manner as it has calculated a local horizontal transfer remainder.

Figure 12:
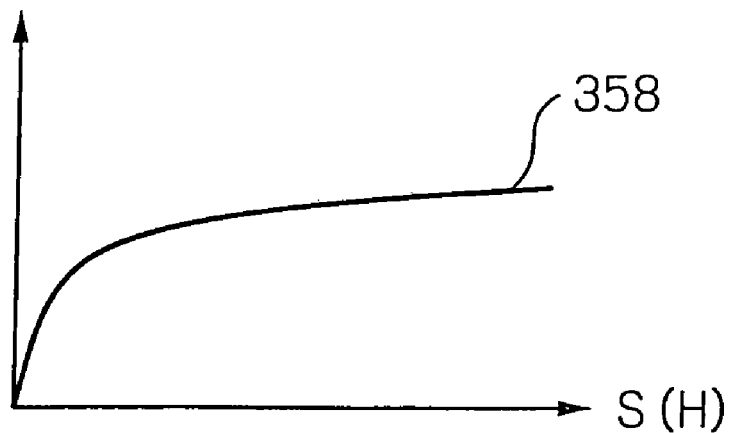
FIG. 12 is a graph showing how signal charges are left untransferred in all stages included in the horizontal transfer path of the alternative embodiment.

Further, assuming that remainders in, e.g. the "(3H/4)+1" stage to "H" stage of the horizontal transfer path 42 are, in the third progress, accumulated in the image data S(H+1) on the basis of the image data S(H) and S(H+1), the calculator 72 calculates a function fH(S) representative of an all-stage horizontal transfer remainder. More specifically, the calculator 72 calculates the function fH(S) in accordance with a curve 358 as shown in FIG. 12 and representative of a relation of the signal amount of the image data S(H+1) to the signal amount of the image data S(H) in the same manner as it has calculated a local horizontal transfer remainder.

Subsequently, the calculator 72 calculates a mean horizontal transfer remainder g1(S) of the first progress on the basis of the functions f0(S) and f1(S) representative of the local horizontal transfer remainder and first progress horizontal transfer remainder, respectively. For a given signal amount S, the mean horizontal transfer remainder g1(S) of the first progress may be expressed as:

$$g1(S)=(f1(S)-f0(S))/(H/4)$$

Likewise, the calculator 72 calculates a mean horizontal transfer remainder g2(S) of the second progress on the basis of the functions f0(S) and f2(S) representative of the local horizontal transfer remainder and second progress horizontal transfer remainder, respectively. For a given signal amount S, the mean horizontal transfer remainder g2(S) of the second progress may be expressed as:

$$g2(S)=(f2(S)-f0(S))/(H/2)$$

Also, the calculator 72 calculates a mean horizontal transfer remainder g3(S) of the third progress on the basis of the functions f0(S) and f3(S) representative of the local horizontal transfer remainder and third progress horizontal transfer remainder, respectively. For a given signal amount S, the mean horizontal transfer remainder g3(S) of the third progress may be expressed as:

$$g3(S)=(f3(S)-f0(S))/(3H/4)$$

To summarize the procedure described so far, assuming that a horizontal transfer remainder in the "M" progress is fM(S), the calculator 72 calculates a mean horizontal transfer remainder gM(S), extending from the "(M−1)*H(N+1)" stage to the "M*H(N+1)" stage by using an expression:

$$gM(S)=(fM(S)-f0(S))/(M*H/(N+1))$$

Subsequently, the calculator 72 calculates a total mean horizontal transfer remainder gH(S) on the basis of the function f0(S) and fH(S) representative of the local horizontal transfer remainder and all-stage horizontal transfer remainder, respectively. For a given signal amount S, the total mean horizontal transfer remainder gH(S) may be expressed as:

$$gH(S)=(fH(S)-f0(S))/H$$

Further, as for the transfer efficiency correction of pixel data on the "0" column to "H/4" column of the image sensing surface 40, the correction amount calculator 74, included in the horizontal transfer efficiency corrector 34 of the alternative embodiment, calculates first horizontal transfer remainders f1(S,x) at the preselected stage positions x on the horizontal transfer path 42 on the basis of the local horizontal transfer remainder f0(S) and mean horizontal transfer remainder g1(S) of the first progress by using an expression:

$$f1(f,x)=f0(S)+x*g1(S)$$

The calculator 74 then calculates first transfer efficiency correction amounts $\Delta S1(x)$ at the preselected stage positions x in accordance with the first horizontal transfer remainders f1(S, x) by using an expression:

$$\Delta S1(x)=f1(S,x)-f1(S,x-1)$$

In the alternative embodiment, the calculator 74 calculates the first transfer efficiency correction amounts $\Delta S1(x)$ of the consecutive stages.

Likewise, as for the transfer efficiency correction of pixel data on the "(H/4)+1" column to "H/2" column of the image sensing surface 40, the calculator 74 calculates second horizontal transfer remainders f2(S,x) at the preselected stage positions x on the horizontal transfer path 42 on the basis of the local horizontal transfer remainder f0(S) and mean horizontal transfer remainder g2(S) of the second progress by using an expression:

$$f2(f,x)=f0(S)+x*g2(S)$$

The calculator 74 then calculates second transfer efficiency correction amounts $\Delta S2(x)$ at the preselected stage positions x in accordance with the second horizontal transfer remainders f2(S,x) by using an expression:

$$\Delta S2(x)=f2(S,x)-f2(S,x-1)$$

In the alternative embodiment, the calculator 74 calculates the second transfer efficiency correction amounts $\Delta S2(x)$ of the consecutive stages.

Also, as for the transfer efficiency correction of pixel data on the "(H/2)+1" column to "3H/4" column of the image sensing surface 40, the calculator 74 calculates third horizontal transfer remainders f3(S,x) at the preselected stage positions x on the horizontal transfer path 42 on the basis of the local horizontal transfer remainder f0(S) and mean horizontal transfer remainder g3(S) of the third progress by using an expression:

$$f3(f,x)=f0(S)+x*g3(S)$$

The calculator 74 then calculates third transfer efficiency correction amounts $\Delta S3(x)$ at the preselected stage positions x in accordance with the third horizontal transfer remainders f3(S,x) by using an expression:

$$\Delta S3(x)=f3(S,x)-f3(S,x-1)$$

In the alternative embodiment, the calculator 74 calculates the third transfer efficiency correction amounts $\Delta S3(x)$ of the consecutive stages.

To summarize the above procedure, assuming a function gM(S) representative of a mean transfer remainder in the "M" progress is gM(S), the calculator 74 calculates horizontal transfer remainders fM(S,x) in the "M" progress extending from the "(M−1)*H/(N+1)+1" stage to the "M*H/(N+1)" stage by using an expression:

$$fM(S,x)=f0(S)+x*gM(S)$$

and then calculates transfer efficiency correction amounts $\Delta SM(x)$ in the "M" progress by using an expression:

$$\Delta SM(x)=fM(S,x)-fM(S,x-1)$$

Further, as for the transfer efficiency correction of pixel data on the "(3H/4)+1" column to "H" column of the image sensing surface 40, the calculator 74 calculates all-stage horizontal transfer remainders fH(S,x) at the preselected stage positions x on the horizontal transfer path 42 on the basis of the local horizontal transfer remainder f0(S) and total mean horizontal transfer remainder gH(S) by using an expression:

$$fH(f,x)=f0(S)+x*gH(S)$$

The calculator 74 then calculates all-stage transfer efficiency correction amounts $\Delta SH(x)$ at the preselected stage positions x in accordance with the all-stage horizontal transfer remainders fH(S,x) by using an expression:

$$\Delta SH(x)=fH(S,x)-fH(S,x-1)$$

In the alternative embodiment, the calculator 74 calculates the total transfer efficiency correction amounts $\Delta SH(x)$ of the consecutive stages.

The calculator 74 may serve as a filter covering nearby pixels, if desired. In such a case, the first, second and third transfer efficiency correction amounts $\Delta S1(x)$, $\Delta S2(x)$ and $\Delta S3(x)$ of each stage as well as the all-stage transfer efficiency correction amounts $\Delta SH(x)$ may advantageously be used for correction executed by the horizontal transfer efficiency corrector 34.

In the alternative embodiment, the horizontal transfer efficiency corrector 34 corrects the digital image signal 124 in such a manner as to correct the horizontal transfer efficiency of the individual image data. For the correction, the corrector 34 adds the first transfer efficiency correction amount $\Delta S1(x)$ to the signal amount S of the image data when the horizontal pixel position x of preselected image data is between the "0" column and the "H/4" column, adds the second transfer efficiency correction amount $\Delta S2(x)$ when the pixel position x is between "(H/4)+1" column and the "H/2" column, adds the third transfer efficiency correction amount $\Delta S3(x)$ when the pixel position x is between "(H/2)+1" column and the "3H/4" column or adds the all-stage transfer efficiency correction amount ΔSH (x) when the pixel position x is between "(3H/4)+1" column and the "H" column.

As stated above, in accordance with the present invention, the solid-state image pickup apparatus 10 measures a transfer remainder at a preselected pixel and a signal amount at a pixel preceding it on the basis of an image signal output by actual pickup, and then calculates a transfer efficiency correction amount in accordance with correspondence between the transfer remainder and signal amount measured. Alternatively, the solid-sate image pickup apparatus may be configured to calculate and store beforehand a transfer efficiency correction amount on the basis of an image signal output by preliminary pickup or a function representative of image data and horizontal transfer remainder for calculating a transfer efficiency correction amount.

In summary, it has been seen that the present invention provides a solid-state image pickup apparatus capable of optimally compensating for the deterioration of horizontal transfer efficiency without regard to differences between specific products of image sensor or temperature and other ambient conditions to thereby output an image thus corrected.

The entire disclosure of Japanese patent application No. 2005-142183 filed on May 16, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
an image sensor for transducing light incident on an image sensing surface, which has a plurality of pixels arranged in rows and columns, to electric signal charges on a pixel-by-pixel basis, shifting the signal charges on the rows transferred from said image sensing surface in a horizontal direction along a horizontal transfer path, concentrating the signal charges at a local portion, and transferring the concentrated signal charges to an output circuit, which converts the concentrated signal charges to an electric signal;
an analog signal processor and an analog-to-digital converter for converting the electric signal to a digital image signal; and
a signal processor for executing digital signal processing on the digital image signal;
said signal processor comprising:
a transfer remainder analyzer for analyzing a local remainder representative of an amount of signal charges left untransferred at the local portion and an all-stage transfer remainder representative of signal charges left untransferred in all stages of said horizontal transfer path;
a horizontal transfer remainder calculator for calculating, based on the local remainder, a local horizontal transfer remainder with respect to signal charge transfer at the local portion, and calculating, based on the all-stage transfer remainder, a mean horizontal transfer remainder with respect to signal charge transfer in the all stages of said horizontal transfer path;
a correction amount calculator for calculating, based on the local horizontal transfer remainder and the mean horizontal transfer remainder, a transfer efficiency correction amount for each position of said horizontal transfer path in the horizontal direction; and
a horizontal transfer efficiency corrector for correcting individual image data, included in the digital image signal and representative of an image picked up, with the transfer efficiency correction amounts corresponding in position in the horizontal direction thereto.

2. The apparatus in accordance with claim 1, wherein said image sensing surface comprises an effective area including a plurality of photosensitive cells for converting incident light to signal charges of levels corresponding to quantities of the incident light, and a local non-effective area and an all-stage non-effective area including a plurality of non-photosensitive zones that generate signal charges at a substantially zero level without regard to incident light,
said effective area is positioned at substantially a center of said image sensing surface for generating signal charges that form the image picked up,
said local non-effective area and said all-stage non-effective area are positioned at least at both sides of said image sensing surface in the horizontal direction,
assuming that a side in the horizontal direction where said output circuit is located is an output side, said local non-effective area is positioned at the output side with said non-photosensitive zone of said local non-effective area constituting a local non-photosensitive zone while said all-stage non-effective area is positioned at a side opposite to the outside side with said non-photosensitive zone of said all-stage non-effective zone constituting an all-stage non-photosensitive zone, and a photosensitive zone for local measurement and a photosensitive zone for all-stage measurement, each including said photosensitive zone, are respectively positioned at the output side of said local non-photosensitive zone and the output side of said all-stage non-photosensitive zone,
said transfer remainder analyzer detects pixel row by pixel row local front image data based on signal charges output from said photosensitive zone for local measurement and local rear image data based on signal charges output from said local non-photosensitive portion, and detects pixel row by pixel row all-stage front image data based on signal charges output from said photosensitive zone for all-stage measurement and all-stage rear image data based on signal charges output from said all-stage non-photoconductive zone,
said horizontal transfer remainder calculator calculates a local horizontal transfer remainder matching with the signal amount on a basis of the local front image data and the local rear image data, calculates an all-stage horizontal transfer remainder matching with the signal amount on a basis of the all-stage front image data and the all-stage rear image data, and calculates a mean horizontal transfer remainder even throughout the all stages of said horizontal transfer path, and
said correction amount calculator calculates, based on the local horizontal transfer remainder and the mean horizontal transfer remainder, stage-based horizontal transfer remainders corresponding in position in the horizontal direction, and then calculates the transfer efficiency correction amounts at the positions in the horizontal direction by using the stage-based horizontal transfer remainders.

3. The apparatus in accordance with claim 2, wherein said local non-effective area and said all-stage non-effective area are positioned at both ends of said effective area in the horizontal direction with the intermediary of said effective area,
said photosensitive zone for all-stage measurement comprising a pixel column closest in position to said all-pixel non-photosensitive zone of said effective area.

4. The apparatus in accordance with claim 3, wherein
said transfer remainder analyzer detects, pixel row by pixel row, the local front image data based on the signal charges output from said photosensitive zone for local measurement on a "0" column and the local rear image data based on the signal charges output from said local non-photosensitive zone on the first column of said image sensing surface, said transfer remainder analyzer detects, pixel row by pixel row, the all-stage front image data based on the signal charges output from said photosensitive zone for all-stage measurement on an "H" column of said image sensing surface and the all-stage rear image data based on the signal charges output from said all-stage non-photosensitive zone on an "H+1" column of said image sensing surface, where H is a positive integer, said horizontal transfer remainder calculator calculates the local horizontal transfer remainder by using a function f0(S) representative of a correspondence of the local area image data to the local front image data, said horizontal transfer remainder calculates the all-stage horizontal transfer remainder by using a function fH(S) representative a correspondence of the all-stage rear image data to the all-stage front image data and matching with the signal amount S, said horizontal transfer remainder calculates the mean horizontal transfer remainder by using a function g (S) expressed as:

$$g(S)=(fH(S)-f0(S))/H,$$

said correction amount calculator calculates stage-based horizontal transfer remainders corresponding to positions x on said horizontal transfer path in the horizontal direction by using a function f(S,x) expressed as:

$$f(S,x)=f0(S)+x*g(S), \text{ and}$$

said correction amount calculator calculates transfer efficiency correction amounts corresponding to the positions x by using a function $\Delta S(x)$ expressed as:

$$\Delta S(x)=f(S,x)-f(S,x-1).$$

5. The apparatus in accordance with claim 2, wherein
said local non-effective area and said all-stage non-effective area both are positioned above or below said effective area in a vertical direction, at least one progress non-effective zone is positioned between said local non-effective area and said all-stage non-effective area while said non-photosensitive zone, lying in said progress non-effective area, is used as a progress non-photosensitive zone, said progress non-effective zone comprises a photosensitive zone for progress measurement, which includes said photosensitive zone, positioned at an output side of said progress non-photosensitive zone, said transfer remainder analyzer detects, pixel row by pixel row, progress front image data based on signal charges output from said photosensitive zone for progress measurement and progress rear image data based on signal charges output from the progress non-photosensitive zone, said horizontal transfer remainder calculator calculates, based on the progress front image data and the progress rear image data, a progress horizontal transfer remainder matching with an signal amount, said horizontal transfer remainder calculator calculates, based on the local horizontal transfer remainder and the progress horizontal transfer remainder, a mean progress horizontal transfer remainder even throughout consecutive stages of said horizontal transfer path up to said progress non-photosensitive zone, said correction amount calculator calculates, based on the local horizontal remainder and the mean progress horizontal transfer remainder, stage-based horizontal transfer remainders of the progress in accordance with the position on said horizontal transfer path in the horizontal direction up to said progress non-photosensitive zone, and said correction amount calculator detects, by using the stage-based horizontal transfer remainders of the progress, transfer efficiency correction amounts of the progress at the positions in the horizontal direction.

6. The apparatus in accordance with claim 5, wherein
said progress non-effective zone comprises N progress non-effective zones arranged between said local non-effective area and said all-stage non-effective area at predetermined intervals, where N is a positive integer, said transfer remainder analyzer detects, pixel column by pixel column, the local front image data based on signal charges output from a "0" column of said photosensitive zone for local measurement of said image sensing surface and the local rear image data based on signal charges output from a first column of said photosensitive zone for local measurement of said image sensing surface, said transfer remainder analyzer detects, pixel column by pixel column, the all-stage front image data based on signal charges output from an "H" column of said photosensitive zone for all-stage measurement of said image sensing surface and the all-stage rear image data based on signal charges output from an "H+1" column of said all-stage non-photoconductive zone of said image sensing surface, said transfer remainder analyzer detects, pixel row by pixel row, the progress front image data based on signal charges output from an "M" photosensitive zone for progress measurement, as counted from the output side, i.e. an "M+H/(N+1)" column of said photosensitive zone for progress measurement and the progress rear image data based on signal charges output from an "M*H/(N+1)−1" column of said progress non-photosensitive zone, where M is an integer smaller than N inclusive, said horizontal transfer remainder calculator calculates the local horizontal transfer remainder by using a function f0(S) representative of a correspondence of the local rear image data to the local front image data and matching with a signal amount S, said horizontal transfer remainder calculator calculates the all-stage horizontal transfer remainder by using a function fH(S) representative of a correspondence of the all-stage rear image data to the all-stage front image data and matching with the signal amount S, said horizontal transfer remainder calculator detects the progress horizontal transfer remainder by using a function fM(S) representative of a correspondence of the progress rear image data to the progress front image data and matching with the signal amount S, said horizontal transfer remainder calculator calculates the mean horizontal transfer remainder from a "$(M-1)*H/(N+1)+1$" column to an "$M*H/(N+1)$" column by using a function gM(S) expressed as:

$$gM(S)=(fM(S)-f0(S))/(M*H/(N+1)),$$

said horizontal transfer remainder calculator detects the mean horizontal transfer remainder from an "$N*H(N+1)+1$" column to an "H" column by using a function gH(S) expressed as:

$$gH(S)=(fH(S)-f0(S))/H,$$

said correction amount calculator calculates stage-based horizontal transfer remainders at the positions x on the horizontal transfer path from a "$(M-1)*H/(N+1)+1$" column to an "$M*H/(N-1)$" column by using a function fM(S,x) expressed as:

$$fM(S,x)=f0(S)+x*gM(S),$$

said correction amount calculator calculates stage-based horizontal transfer remainders at the positions x on said horizontal transfer path from an "$N*H/(N+1)+1$" column to an "H" column by using a function fH(S,x) expressed as:

$$fH(S,x)=f0(S)+x*gH(S),$$

said correction amount calculator detects stage-based horizontal transfer remainders at the positions x on said horizontal transfer path form a "$(M-1)*H/(N+1)-1$" column to an "$M*H/(N+1)$" column by using a function ΔSM(x) expressed as:

$$\Delta SM(x)=fM(S,x)-fM(S,x-1), \text{ and}$$

said correction amount calculator calculates transfer efficiency correction amounts at the positions x on said horizontal transfer path from an "$N*H/(N+1)+1$" column to the "H" column by using a function ΔSH(x) expressed as:

$$\Delta SH(x)=fH(S,x)-fH(S,x-1).$$

* * * * *